(12) United States Patent
Teil et al.

(10) Patent No.: US 7,500,033 B2
(45) Date of Patent: Mar. 3, 2009

(54) UNIVERSAL SERIAL BUS TRANSMITTER

(75) Inventors: Vincent Teil, Ramonville (FR); Philippe Debosque, Toulouse (FR); Cor H. Voorwinden, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 308 days.

(21) Appl. No.: 10/598,352

(22) PCT Filed: Feb. 6, 2005

(86) PCT No.: PCT/EP2005/001655

§ 371 (c)(1),
(2), (4) Date: Sep. 28, 2006

(87) PCT Pub. No.: WO2005/086008

PCT Pub. Date: Sep. 15, 2005

(65) Prior Publication Data

US 2008/0195792 A1  Aug. 14, 2008

(51) Int. Cl.
*G06F 13/42* (2006.01)
*G06G 7/12* (2006.01)

(52) U.S. Cl. .................. 710/105; 710/106; 710/305; 327/563

(58) Field of Classification Search .......... 710/105, 710/106, 305; 327/563
See application file for complete search history.

(56) References Cited

U.S. PATENT DOCUMENTS 5,883,531 A * 3/1999 Kuo .................... 327/108
5,912,569 A    6/1999 Alleven
6,356,582 B1 * 3/2002 Mazer et al. ............ 375/219
7,003,599 B2 * 2/2006 Warren et al. ........... 710/71
2002/0190755 A1  12/2002 Lee
2006/0267641 A1 * 11/2006 Khan et al. ............. 327/108
2007/0279096 A1 * 12/2007 Chong et al. ........... 326/83
2007/0279125 A1 * 12/2007 Tripathi et al. .......... 327/563
2008/0123726 A1 * 5/2008 Lin et al. ............... 375/226

OTHER PUBLICATIONS

A Novel Transmitter In High-Speed Serial Data Communication, Jun Xiong et al., IEEE, 2003.*

* cited by examiner

*Primary Examiner*—Khanh Dang

(57) ABSTRACT

A Universal Serial Bus transmitter comprising a USBTXP input and a USBTXM input for receiving respective data signals, and a USBP driver and a USBM driver for applying the respective data signals to USBP and USBM wires respectively. The transmitter comprises a transmit signal generator responsive to an asserting edge of a signal at one of the USBP and USBM inputs to define a leading edge of a transmit signal (USBTXIP) and to a corresponding de-asserting edge of a signal at the other of the USBP and USBM inputs to define the subsequent trailing edge of said transmit signal (USBTXIP). Even if the duty cycles of the input signals USBTXP and USBTXM are substantially different from 50%, this does not cause unacceptable jitter of successive crossover points nor cause the crossover point voltage level to be outside the USB tolerance, centred on 50% of the voltage swings of the USBP and USBM signals.

10 Claims, 4 Drawing Sheets

UNIVERSAL SERIAL BUS TRANSMITTER

FIELD OF THE INVENTION

This invention relates to a Universal Serial Bus transmitter.

BACKGROUND OF THE INVENTION

The Universal Serial Bus ('USB') system is a fast, bi-directional, isochronous, low cost, dynamically attachable serial interface. The expression 'Universal Serial Bus transmitter' is used herein to mean a transmitter that fulfils the general functional requirements of the Universal Serial Bus standard, whether or not it meets the detailed manufacturing and operational tolerances of the USB standard.

The USB standard was developed to define an external expansion bus which makes adding peripherals to a personal computer ('PC') or similar data processing device as easy as hooking up a telephone to a wall-jack. The standard is published on the Internet at the site http://www.usb.org/developers/docs. The standard's driving goals were ease-of-use and low cost. These were enabled with an external expansion architecture, which highlights:

PC host controller hardware and software,
robust connectors and cable assemblies,
peripheral friendly master-slave protocols,
expandable through multi-port hubs.

The USB is a cable bus that supports data exchange between a host computer and a wide range of simultaneously accessible peripherals. The attached peripherals share USB bandwidth through a host scheduled token based protocol. The bus allows peripherals to be attached, configured, used, and detached while the host and other peripherals are in operation. This is referred to as dynamic (or hot) attachment and removal.

The Universal Serial Bus connects USB devices with the USB host. The USB physical interconnect is a tiered star topology. A hub is at the centre of each star Each wire segment is a point-to-point connection between the host and a hub or function, or a hub connected to another hub or function. There is only one host in any USB system. The USB interface to the host computer system is referred to as the host controller. The host controller may be implemented in a combination of hardware, firmware, or software.

The USB supports transfer rates up to 12 Mbs for the real-time data of voice, audio, and compressed video, with extension planned to higher speeds. Signal integrity is enhanced by using differential drivers, receivers and shielding. Features provided include: cyclic redundancy check ('CRC') protection over control and data fields, error handling/fault recovery mechanisms built into the protocol, self-recovery in protocol, using time-outs for lost or broken packets, and support for identification of faulty devices. Two modes of operation are provided by the standard: low speed, for Interactive Devices at 10-100 Kb/s, and medium speed at 500 Kb/s to 12 Mb/s, for Phone, Audio, Compressed Video.

A root hub is integrated within the host system to provide one or more attachment points. USB transfers signal and power over a four wire cable shown schematically in FIG. 1 of the accompanying drawings. The signaling occurs over two wires D+ and D− and point-to-point segments. The signals on each segment are differentially driven into a cable of 90Ω intrinsic impedance. The differential receiver features input sensitivity of at least 200 mV and sufficient common mode rejection. A clock is transmitted encoded along with the differential data. The clock encoding scheme is NRZI with bit stuffing to ensure adequate transitions. A SYNC field precedes each packet to allow the receiver(s) to synchronize their bit recovery clocks. The cable also carries VBus and GND wires on each segment to deliver power to devices.

The USB uses a differential output driver to drive the USB data signal onto the USB cable. The static output swing of the driver in its low state must be below the VOL of 0.3 V with a 1.5 kΩ load to 3.6 V and in its high state must be above the VOH of 2.8 V with a 15 kΩ load to ground. The output swings between the differential high and low state must be well balanced to minimize signal skew. Slew rate control on the driver is required to minimize the radiated noise and cross talk. The driver's outputs must support three-state operation to achieve bi-directional half duplex operation. High impedance is also required to isolate the port from downstream devices that are being hot inserted or which are connected but powered down.

The signals transmitted on the two signal wires, referred to as 'USBP' and 'USBM' need to be synchronized and it is important that the falling edge of one signal coincide with the rising edge of the other and, in particular, it is important to control the cross-over level, that is to say the voltage at which the signals on the two wires have the same value, and the jitter, that is to say the variations for successive signals in the time at which the cross-over point occurs.

Patent specification U.S. Pat. No. 5,912,569 discloses a transmitter in which one of the output signals is delayed relative to the other in order to correct the crossover level.

SUMMARY OF THE INVENTION

The present invention provides a Universal Serial Bus transmitter and system as described in the accompanying claims.

DETAILED DESCRIPTION OF THE DRAWINGS

Figure 1:
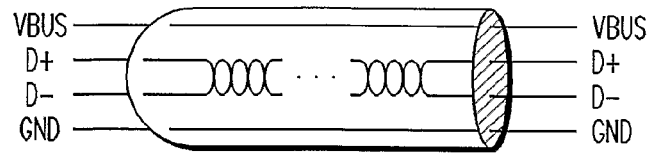
FIG. 1 is a schematic diagram of the type of cable used in a USB system.
Figure 2:
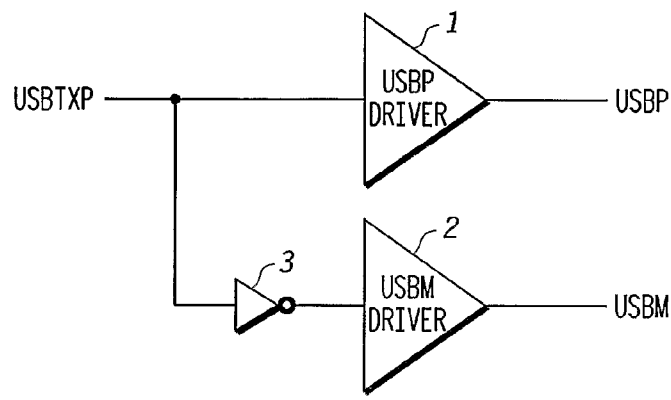
FIG. 2 is a block schematic diagram of a known USB transmitter.

FIG. 2 shows a known USB transmitter. Data is supplied to inputs USBTXP and USBTXM. A USBP driver 1 receives the USBTXP signal directly at its input and has a USBP output that provides a shaped and amplified signal to the D+ line of the USB cable. A USBM driver 2 receives the USBTXP signal at its input after inversion by an inverter 3 and has a USBM output that provides a shaped and amplified signal to the D− line of the USB cable through an inverter.

In operation, the differential signals from the USBP and USBM outputs are transmitted over the lines D+ and D−. Data transmission within a packet is obtained with differential signals. The protocol of the USB specification provides for J and K data states, which are the two logical levels used to communicate differential data in the system. The start of a packet (SOP) is signaled by the originating port by driving the D+ and D− lines from the Idle state to the opposite logic level (K state). This switch in levels represents the first bit of the SYNC field. A Single-Ended Open ('SE0') state, in which both the D+ and D− lines are de-asserted (driven to low) is used to signal an end-of-packet (EOP).

Figure 3:
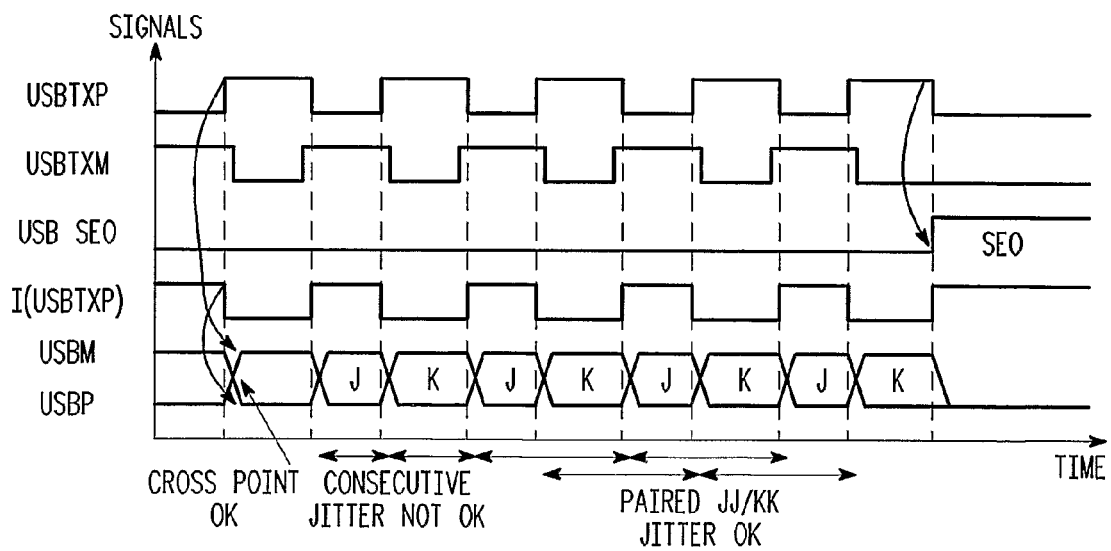
FIG. 3 is a wavefoun diagram of output signals of the transmitter of FIG. 2.

The wave forms of the signals at the inputs USBTXP and USBTXM and the outputs USBP and USBM are shown in FIG. 3. It will be appreciated that in this example the input USBTXM is only used to detect a single-ended zero, corresponding to the end of the frame in the USB protocol and produce a corresponding signal USB SE0 setting both USBTXP and USBTXM simultaneously to de-asserted.

The USB standard contains specifications for jitter tolerances (see sections 5.10.3 concerning clock jitter, and 7.1.13 concerning data jitter, for example). It is found that the duty cycle of the input signal and its complement !USBTXP (as well as USBTXM) is liable to be substantially different from 50%. As shown in FIG. 3, in this case, the time between successive transitions of the USBP and USBM signals from the transmitter of FIG. 2, in other words the time between successive crossover points, is liable to unacceptable jitter. Thus, the width of a pulse J is unacceptably different from the width of the next pulse K, even if no such unacceptable jitter exists between one pulse J and the next pulse J, or between one pulse K and the next pulse K.

Figure 4:
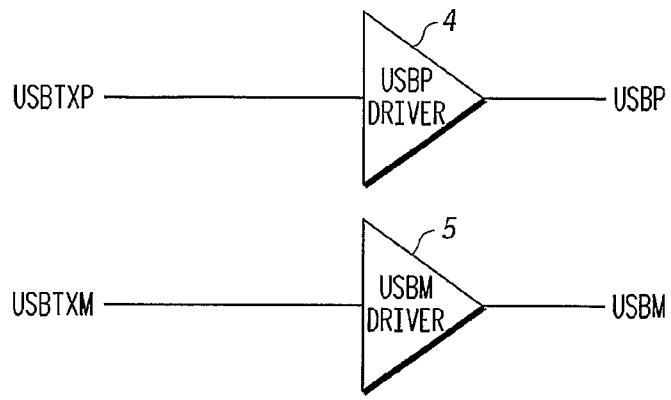
FIG. 4 is a block schematic diagram of another known USB transmitter.

FIG. 4 shows another known USB transmitter. Data is again supplied to inputs USBTXP and USBTXM. A USBP driver 4 receives the USBTXP signal directly at its input and has a USBP output that provides a shaped and amplified signal to the D+ line of the USB cable. A USBM driver 5 receives the USBTXM signal directly at its input and has a USBM output that provides a shaped and amplified signal to the D− line of the USB cable.

Figure 5:
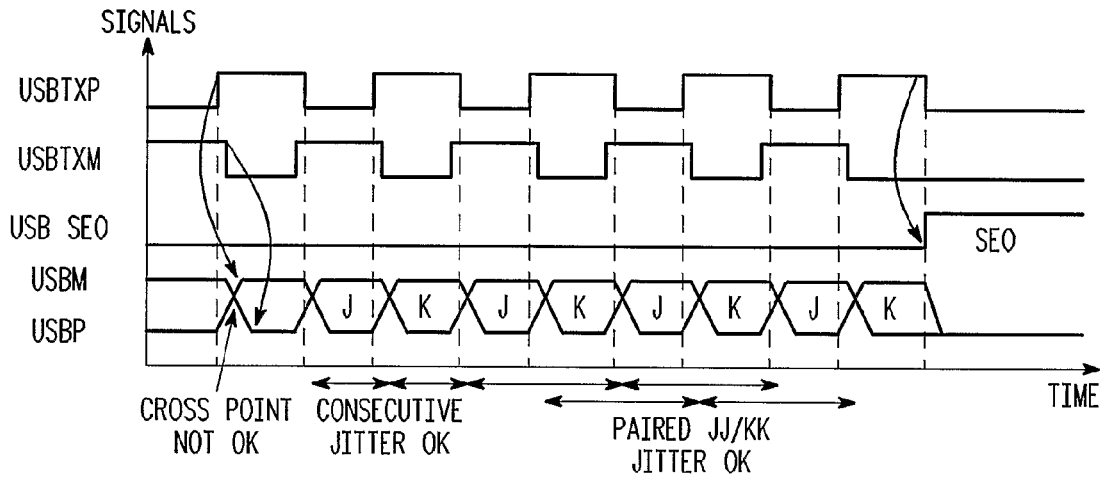
FIG. 5 is a waveform diagram of output signals of the transmitter of FIG. 4.

In operation, the differential signals from the USBP and USBM outputs are again transmitted over the lines D+ and D−. The wave forms of the signals at the inputs USBTXP and USBTXM, the outputs USBP and USBM and the single-ended zero signal USB SE0 are shown in FIG. 5.

The USB standard contains specifications for crossover point voltage level tolerances (see section 7.1.2, for example). Once again, the duty cycle of the input signals USBTXP and USBTXM is liable to be substantially different from 50%. As shown in FIG. 5, in this case, the voltage level at which corresponding transitions of the USBP and USBM signals from the transmitter of FIG. 4 are the same, in other words the crossover point voltage level, is liable to be substantially outside the USB tolerance, which is centered on 50% of the voltage swings of the USBP and USBM signals.

Figure 6:
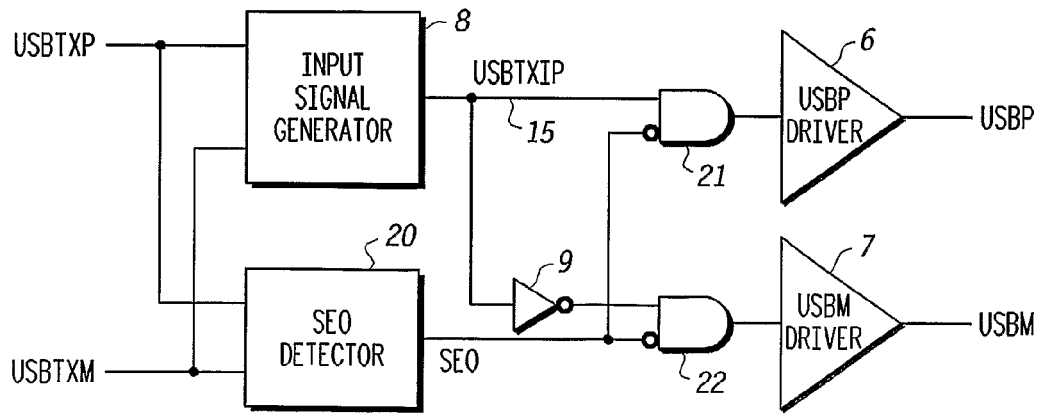
FIG. 6 is a block schematic diagram of a USB transmitter in accordance with one embodiment of the invention, given by way of example.

FIG. 6 shows a USB transmitter in accordance with one embodiment of the invention. Data is again supplied to inputs USBTXP and USBTXM. A USBP driver 6 receives the data signal indirectly at its input and has a USBP output that provides a shaped and amplified signal to the D+ line of the USB cable. A USBM driver 7 receives the data signal indirectly at its input and has a USBM output that provides a shaped and amplified signal to the D− line of the USB cable. In this embodiment of the invention, the drivers 6 and 7 receive the data signals through an input signal generator 8. The signal generator 8 is responsive to an asserting edge of a signal at one of the USBTXP and USBTXM inputs to define a leading edge of the signal supplied to the drivers 6 and 7 and to a corresponding de-asserting edge of a signal at the other of the USBTXP and USBTXM inputs to define the subsequent trailing edge of the signal supplied to the drivers 6 and 7. The signal from the signal generator 8 is supplied directly to one of the drivers 6 and 7 and is supplied to the other of the drivers 6 and 7 through an inverter 9.

More specifically, in the transmitter shown in FIG. 6, the signal generator 8 is responsive to a rising edge of the signal at the USBTXP input to define a rising edge of a signal USBTXIP supplied to the drivers 6 and 7 and to a corresponding rising edge of the signal at the USBTXM input to define the subsequent falling edge of the signal supplied to the drivers 6 and 7. It will be appreciated that the input signals USBTXP and USBTXM, as well as the output signals USBP and USBM, are differential signal pairs, so that assertion of one of the signals of the pair by a rising edge corresponds to de-assertion of the other signal of the pair. The signal USBTXIP is supplied directly to the USBP driver 6 and is supplied to the USBM driver through the inverter 9, so that the signals USBP and USBM supplied from the outputs of the drivers 6 and 7 to the lines D+ and D− are complementary pairs.

Figure 7:
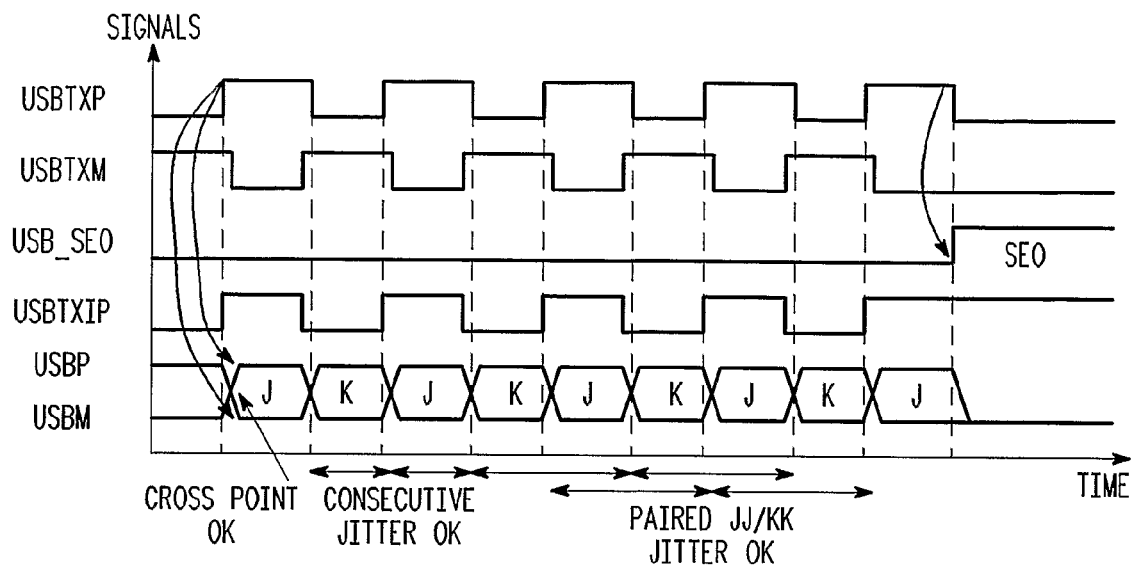
FIG. 7 is a waveform diagram of output signals of the transmitter of FIG. 6.

In operation, the differential signals from the USBP and USBM outputs are again transmitted over the lines D+ and D−. The wave forms of the signals at the inputs USBTXP and USBTXM, the outputs USBP and USBM, the single-ended zero signal USB SE0 and the signal USBTXIP supplied to the drivers 6 and 7 are shown in FIG. 7.

Since the asserting edges of the signals USBP and USBM are always derived from the asserting edges of the input signals USBTXP and USBTXM, while the de-asserting edges of the signals USBP and USBM are always derived from the de-asserting edges of the input signals USBTXP and USBTXM, even if the duty cycles of the input signals USBTXP and USBTXM are substantially different from 50%, this does not cause unacceptable jitter of successive crossover points. Also, since the signals USBP and USBM are complementary, even if the duty cycles of the input signals USBTXP and USBTXM are substantially different from 50%, this does not cause the crossover point voltage level to be outside the USB tolerance, centered on 50% of the voltage swings of the USBP and USBM signals.

In addition to the Input signal generator 8, the USB transmitter of FIG. 6 includes an SE0 detector 20, whose output is asserted when the signals USBP and USBM are simultaneously de-asserted, an AND circuit 21 inserted between the input signal generator 8 and the USBP driver 6, and an AND circuit 22 inserted between the inverter 9 and the USBM driver 7. The AND circuits 21 and 22 receive the inverse of the output of the SE0 detector 20 on their other inputs. In operation, the AND circuits 21 and 22 override the control of the drivers 6 and 7 by the input signal generator 8 and force both the lines USBP and USBM de-asserted when an SE0 is detected.

Figure 8:
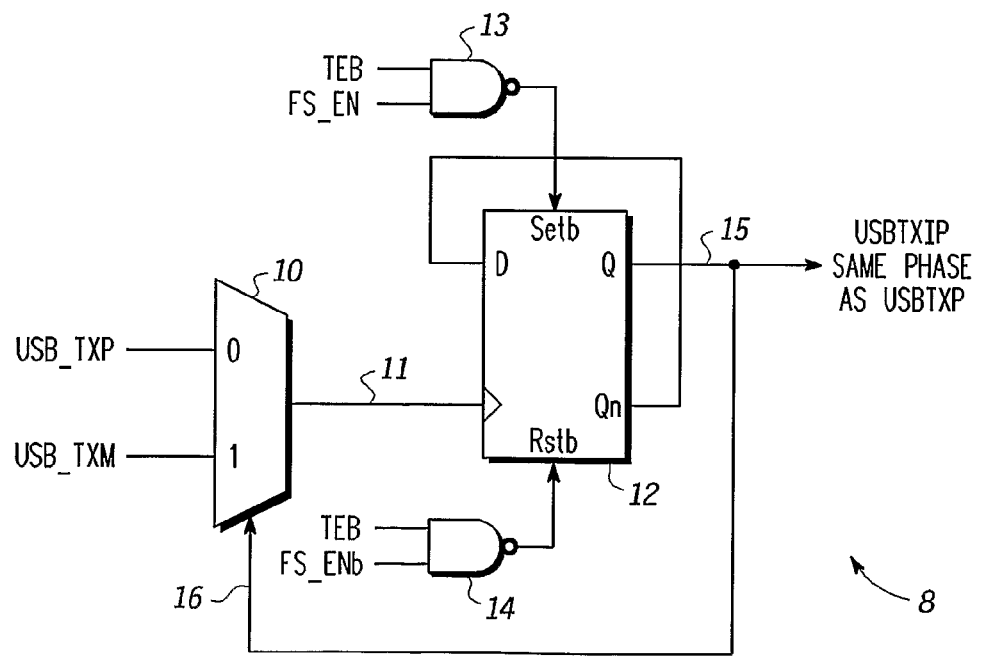
FIG. 8 is a more detailed block schematic diagram of the USB transmitter of FIG. 6.

An embodiment of the input signal generator 6 is shown in more detail in FIG. 8. The generator shown in FIG. 8 comprises a multiplexer 10 connected to receive the input signals USBTXP and USBTXM on its '0' and '1' inputs respectively. The multiplexer 10 has an output 11 connected to the data input of a re-settable flip-flop 12 having a 'Q' output for supplying the signal USBTXIP on a connector 15 and a negative '$Q_n$' output connected in feedback to a 'D' input of the flip-flop 12.

The value of the single output 11 of the multiplexer 10 is set by the rising edge of one of the signals USBTXP or USBTXM as selected by a feedback of the signal USBTXIP on a selection input 16. More specifically, if initially USBTXIP is high, the multiplexer 10 will select the USBTXM signal and USBTXM will be routed to the signal 11, that is to say the signal 11 will change state in response to a rising edge of the signal USBTXM. The flip-flop 12 will await a rising edge of the signal 11 (produced by a rising edge of the signal USBTXM). When signal 11 rises, the Q output of the flip-flop 12 will be set to 0 because the D data which is connected to Qb of the flip-flop=0. Now, USBTXIP is low and the multiplexer will select the USBTXP signal and USBTXP will be routed to the signal 11. Now the flip-flop 12 will await a falling edge of the signal 11 corresponding to a rising edge of the signal USBTXP.

A NAND gate 13 is connected to receive a transmit enable bar signal TEB when transmission by the transmitter is to be inhibited and a full-speed enable signal FS_EN when the full-speed protocol of the USB standard is to be used. The output of the NAND gate 13 is connected to a set input Setb of the flip-flop 12. A NAND gate 14 is connected to receive the transmit enable bar signal TEB when transmission by the transmitter is to be inhibited and a full-speed enable bar signal FS_ENb when the slow-speed protocol of the USB standard is to be used. The output of the NAND gate 14 is connected to a reset input Rstb of the flip-flop 12. In use, the transmitter forms part of a host node also comprising a processor that supplies the signals TEB, FS_EN and FS_ENb.

In operation, prior to transmission, the processor asserts the signal TEB and one of the signals FS_EN and FS_ENb, in response of a voltage corresponding to a pull-up resistor at the remote receiver on the line D+ (full-speed) or D− (slow-speed). The NAND gates respond by initializing the flip-flop 12 to the state '1' on D+ and '0' on D− if the full-speed protocol is required or to the state '0' on D+ and '1' on D− if the slow-speed protocol is required. This state of the flip-flop 12 is initially maintained by the feedback from its $Q_n$ output to its D input when the transmit enable bar signal TEB is de-asserted to enable transmission.

When a data signal is next asserted on one of the inputs USBTXP and USBTXM, if the flip-flop 12 is already in the corresponding state, no change of its state occurs. Only when a data signal is next asserted on the other of the inputs USBTXP and USBTXM will the flip-flop 12 change state. It will be appreciated that this mode of operation ensures that the flip-flop 12 avoids unintentional single-ended zero states (D+=D−=0) and drives either J state (D+=1, D−=0) or K state (D+=0, D−=1) except when an SE0 state is forced (D+=D−=0).

Figure 9:
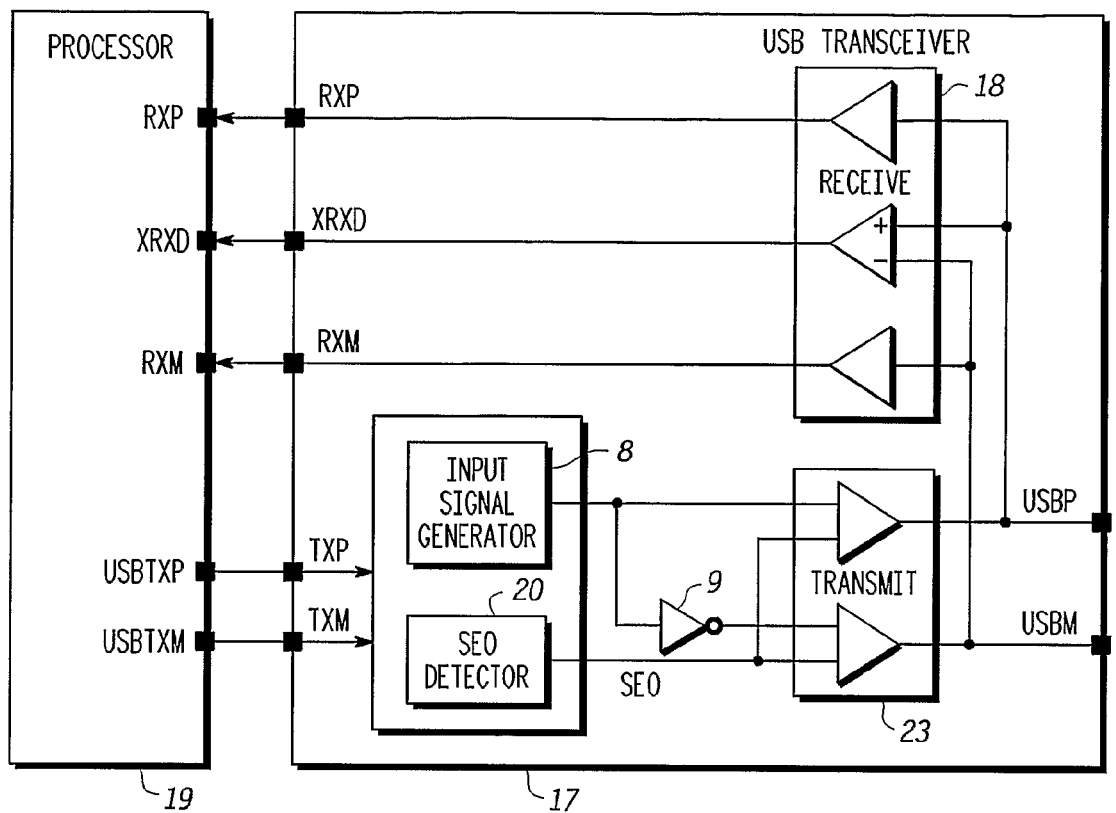
FIG. 9 is a block schematic diagram of a USB host transceiver in accordance with an embodiment of the invention, including the transmitter of FIG. 6 given by way of example.

An embodiment of a USB host node in accordance with the invention is shown in FIG. 9. The host node comprises a transceiver 17 including the transmitter of FIG. 6, whose transmit module comprising the drivers 6 and 7 and the AND circuits 21 and 22 is shown at 23, and a receiver module 18 for receiving signals from the D+ and D− lines of the cable, together with a signal processor 19. The processor 19 supplies the signals USBTXP and USBTXM to the input signal generator 8 of the transmitter and also supplies the signals TEB, FS_EN and FS_ENb in the case of a transmitter as shown in FIG. 8.

The invention claimed is:

1. A Universal Serial Bus transmitter comprising:
   a USBTXP input and a USBTXM input for receiving respective data signals;
   a transmit signal generator responsive to said USBTXP and USBTXM inputs for generating a transmit signal (USBTXIP); and
   a USBP driver and a USBM driver responsive to said transmit signal (USBTXIP) for applying the respective data signals to USBP and USBM wires respectively;
   characterised in that said transmit signal generator comprises:
   multiplexer means having inputs for receiving said USBTXP and a USBTXM inputs respectively and a multiplexer output;
   said multiplexer output being selectively responsive alternately to an asserting edge of a signal at one of said USBTXP and USBTXM inputs to define a leading edge of a transmit signal (USBTXIP) and to a corresponding de-asserting edge of a signal at the other of said USBTXP and USBTXM inputs to define the subsequent trailing edge of said transmit signal (USBTXIP).

2. A Universal Serial Bus transmitter as claimed in claim 1, wherein said transmit signal generator comprises:
   an output for applying said transmit signal (USBTXIP) to one of said USBP and USBM wires and inverting means for inverting said transmit signal and applying the inverted signal to the other of said USBP and USBM wires.

3. A Universal Serial Bus transmitter as claimed in claim 1, wherein said transmit signal generator comprises:
   flip-flop means for producing said transmit signal (USBTXIP) at a flip-flop output whose state is responsive to a change of state of said multiplexer output, and feedback means responsive to said transmit signal (USBTXIP) for applying a selection signal to said multiplexer means so that said multiplexer output is selectively responsive alternately to said asserting edge of a signal at one of said USBP and USBM inputs and to said corresponding de-asserting edge of a signal at the other of said USBP and USBM inputs.

4. A Universal Serial Bus transmitter as claimed in claim 1, and including Single-Ended Open detector means responsive to de-assertion of the signals at both of said USBTXP and USBTXM inputs for causing de-assertion of the data signals applied by the transmitter to both said USBP and USBM wires.

5. A Universal Serial Bus transceiver comprising a Universal Serial Bus transmitter as claimed in claim 1, and a Universal Serial Bus receiver responsive to signals received over said USBP and USBM wires.

6. A Universal Serial Bus transmitter comprising:
   an USBTXP input and a USBTXM input for receiving respective data signals;
   a transmit signal generator responsive to said USBTXP and USBTXM inputs for generating a transmit signal (USBTXIP); and
   a USBP driver and a USBM driver responsive to said transmit signal (USBTXIP) for applying the respective data signals to USBP and USBM wires respectively;
   characterised in that said transmit signal generator comprises:
   a multiplexer having inputs for receiving said USBTXP and a USBTXM inputs respectively and a multiplexer output;
   said multiplexer output being selectively responsive alternately to an asserting edge of a signal at one of said USBTXP and USBTXM inputs to define a leading edge of a transmit signal (USBTXIP) and to a corresponding de-asserting edge of a signal at the other of said USBTXP and USBTXM inputs to define the subsequent trailing edge of said transmit signal (USBTXIP).

7. A Universal Serial Bus transmitter as claimed in claim 6, wherein said transmit signal generator comprises:

an output for applying said transmit signal (USBTXIP) to one of said USBP and USBM wires and an invertor for inverting said transmit signal and applying the inverted signal to the other of said USBP and USBM wires.

8. A Universal Serial Bus transmitter as claimed in claim 6, wherein said transmit signal generator comprises:

a flip-flop for producing said transmit signal (USBTXIP) at a flip-flop output whose state is responsive to a change of state of said multiplexer output; and a feedback circuit responsive to said transmit signal (USBTXIP) for applying a selection signal to said multiplexer so that said multiplexer output is selectively responsive alternately to said asserting edge of a signal at one of said USBP and USBM inputs and to said corresponding de-asserting edge of a signal at the other of said USBP and USBM inputs.

9. A Universal Serial Bus transmitter as claimed in claim 6, and including Single-Ended Open detector responsive to de-assertion of the signals at both of said USBTXP and USBTXM inputs for causing de-assertion of the data signals applied by the transmitter to both said USBP and USBM wires.

10. A Universal Serial Bus transceiver comprising a Universal Serial Bus transmitter as claimed in claim 6, and a Universal Serial Bus receiver responsive to signals received over said USBP and USBM wires.

* * * * *